(12) United States Patent
Cho et al.

(10) Patent No.: US 8,623,968 B2
(45) Date of Patent: Jan. 7, 2014

(54) POLYIMIDE PRECURSOR COMPOSITION, METHOD FOR PREPARING POLYIMIDE, POLYIMIDE PREPARED BY USING THE METHOD, AND FILM INCLUDING THE POLYIMIDE

(75) Inventors: Eun Seog Cho, Seoul (KR); Byung Hee Sohn, Yongin-si (KR); Young Suk Jung, Suwon-si (KR); Yoo Seong Yang, Yongin-si (KR); Sang Mo Kim, Hwaseong-si (KR)

(73) Assignee: Samsung Electronics Co., Ltd. (KR)

( * ) Notice: Subject to any disclaimer, the term of this patent is extended or adjusted under 35 U.S.C. 154(b) by 194 days.

(21) Appl. No.: 13/226,736

(22) Filed: Sep. 7, 2011

(65) Prior Publication Data

US 2012/0157652 A1   Jun. 21, 2012

(30) Foreign Application Priority Data

Dec. 20, 2010   (KR) .................. 10-2010-0130905

(51) Int. Cl.
*C08F 283/04*   (2006.01)
*C08G 69/48*   (2006.01)
*C08G 69/08*   (2006.01)
*C08G 18/00*   (2006.01)

(52) U.S. Cl.
USPC ........... 525/424; 525/420; 525/282; 528/420; 528/291; 528/64; 528/52; 428/473.5

(58) Field of Classification Search
USPC ............ 525/424, 420, 282; 528/420, 291, 64, 528/52; 428/473.5
See application file for complete search history.

(56) References Cited

U.S. PATENT DOCUMENTS

2008/0311303 A1   12/2008   Naiki et al.
2010/0113689 A1    5/2010   Naiki et al.

FOREIGN PATENT DOCUMENTS

JP       2004339363 A    12/2004
KR   1020070050006 A     5/2007
KR   1020070116259 A    12/2007

*Primary Examiner* — Duc Truong
(74) *Attorney, Agent, or Firm* — Cantor Colburn LLP

(57) ABSTRACT

A polyimide precursor composition includes a polyamic acid including a repeating unit represented by Chemical Formula 1 and diisocyanate represented by Chemical Formula 2.

Chemical Formula 1

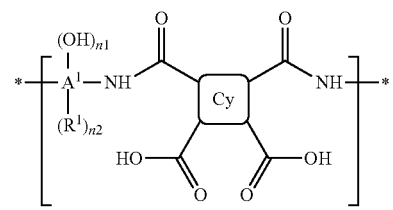

OCN-A$^2$-NCO                    Chemical Formula 2

The diisocyanate represented by Chemical Formula 2 is included in an amount of about 0.01 moles to about 10 moles based on 100 moles of the repeating unit represented by Chemical Formula 1 in the polyamic acid.

7 Claims, 4 Drawing Sheets

POLYIMIDE PRECURSOR COMPOSITION, METHOD FOR PREPARING POLYIMIDE, POLYIMIDE PREPARED BY USING THE METHOD, AND FILM INCLUDING THE POLYIMIDE

CROSS-REFERENCE TO RELATED APPLICATION

This application claims priority to Korean Patent Application No. 10-2010-0130905 filed on Dec. 20, 2010, and all the benefits accruing therefrom under 35 U.S.C. §119, the content of which in its entirety is herein incorporated by reference.

BACKGROUND

1. Field

This disclosure relates to a polyimide precursor composition, a method of preparing a polyimide, a polyimide prepared by using the method, and a film including the polyimide.

2. Description of the Related Art

Information technology is advancing rapidly, and electronic information retrieval is becoming more popular. There is an increasing need for an ultra-light, flexible, thin display that consumes a low amount of electrical power for visualizing and delivering the information regardless of place and time. To produce a flexible display, advances in flexible substrates, organic and inorganic materials useful in low temperature processes, flexible electrical components, and container and packaging technologies are also required. Among these, the flexible substrate may determine overall performance, reliability, and price of a display.

The flexible substrate may include a plastic substrate since plastic substrates have easy workability and low weight and are applicable to continuous processing.

However, since plastic substrates may have a low thermal stability, their thermal properties may need to be improved. To meet these demands, there is an increasing need for a polyimide polymer having excellent heat resistance.

SUMMARY

An embodiment of this disclosure provides a polyimide precursor composition that may provide a polyimide having excellent thermal stability and optical transmittance.

Another embodiment of this disclosure provides a method of preparing a polyimide having excellent thermal stability and optical transmittance.

Yet another embodiment of this disclosure provides a polyimide prepared by using the method of preparing a polyimide.

Still another embodiment of this disclosure provides a film including the polyimide.

According to an embodiment of this disclosure, a polyimide precursor composition is provided that includes a polyamic acid including a repeating unit represented by the following Chemical Formula 1, and a diisocyanate represented by the following Chemical Formula 2. The diisocyanate represented by the following Chemical Formula 2 is included in an amount of about 0.01 moles to about 10 moles based on 100 moles of the repeating unit represented by the following Chemical Formula 1 in the polyamic acid.

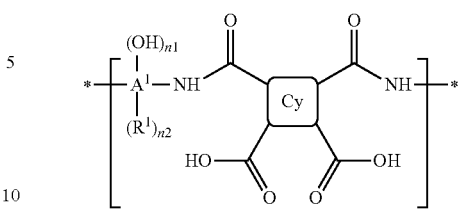

Chemical Formula 1

In Chemical Formula 1,

Cy is the same or different in each repeating unit, and each Cy is independently a tetravalent functional group including a substituted or unsubstituted C4 to C20 carbocyclic group, a substituted or unsubstituted C6 to C20 monocyclic aromatic group, a substituted or unsubstituted C2 to C20 condensed polycyclic aromatic group, C2 to C20 non-condensed polycyclic aromatic groups linked to each other through a substituted or unsubstituted aromatic group, or a combination including at least one of the foregoing, $A^1$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, a substituted or unsubstituted C2 to C40 siloxane, or a combination including at least one of the foregoing, $R^1$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n1 is an integer of 1 or greater, n2 is an integer of from 0 to 10, and n1+n2 is determined by a valence of $A^1$.

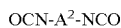OCN-$A^2$-NCO        Chemical Formula 2

In Chemical Formula 2, $A^2$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C4 to C40 heteroaralkylene group, a substituted or unsubstituted C5 to C40 cycloalkylene group, a substituted or unsubstituted C5 to C40 heterocycloalkylene group, or a combination including at least one of the foregoing.

The diisocyanate represented by the above Chemical Formula 2 may be included in an amount of about 2 moles to about 7 moles based on 100 moles of the repeating unit represented by the above Chemical Formula 1 in the polyamic acid.

Specifically, the repeating unit represented by the above Chemical Formula 1 may include a repeating unit represented by the following Chemical Formula 3.

Chemical Formula 3

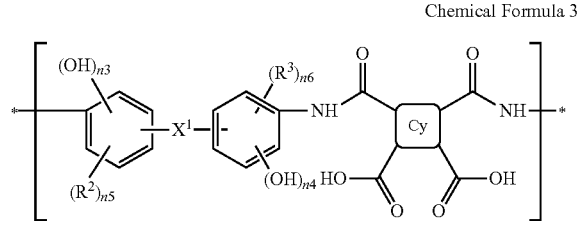

In Chemical Formula 3,

Cy is the same as in Chemical Formula 1, $X^1$ is a single bond, $(CR^{200}R^{201})_{k1}$ (wherein $R^{200}$ and $R^{201}$ are the same or different and are independently hydrogen, a hydroxyl group, a C1 to C10 alkyl group, a C1 to C10 fluoroalkyl group, or a combination including at least one of the foregoing, and k1 is an integer of from 1 to 5), $SO_2$, O, C(=O), or a combination including at least one of the foregoing, $R^2$ and $R^3$ are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n3 to n6 are independently integers of from 0 to 4, n3+n5 is an integer of from 0 to 4, n4+n6 is an integer of from 0 to 4, and n3+n4 is an integer of from 1 to 8.

More specifically, the repeating unit represented by the above Chemical Formula 1 may include repeating units represented by the following Chemical Formulae 4 to 14, or a combination including at least one of the foregoing.

Chemical Formula 4

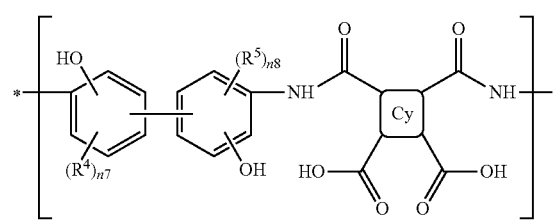

Chemical Formula 5

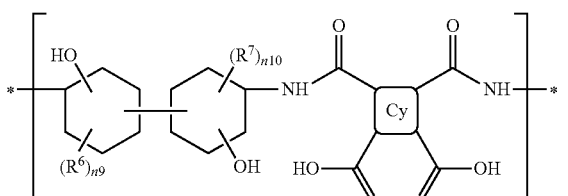

Chemical Formula 6

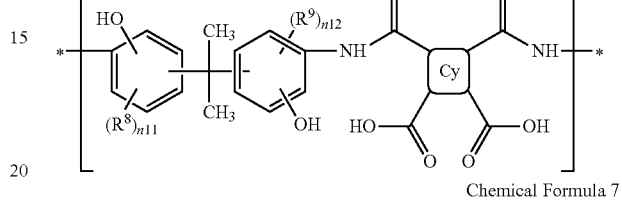

Chemical Formula 7

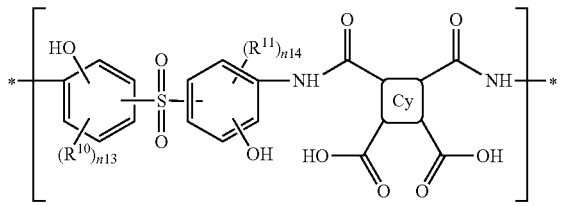

Chemical Formula 8

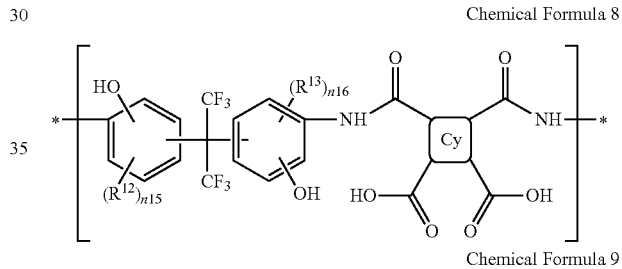

Chemical Formula 9

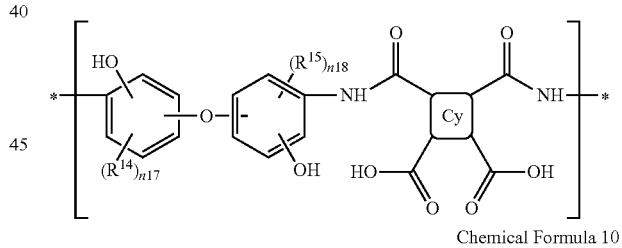

Chemical Formula 10

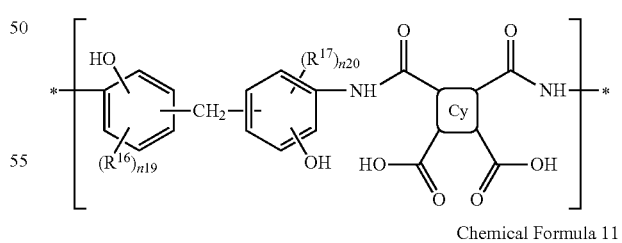

Chemical Formula 11

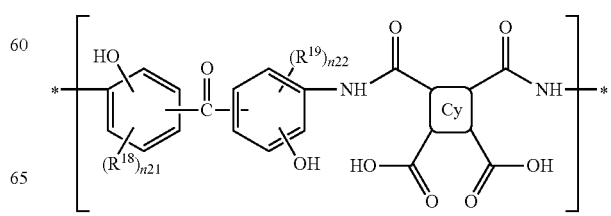

Chemical Formula 12

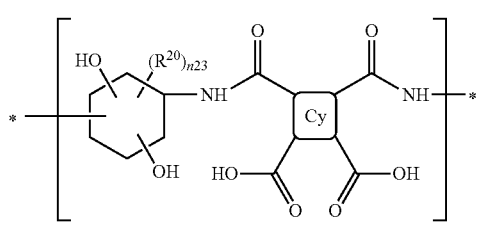

Chemical Formula 15

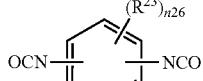

Chemical Formula 16

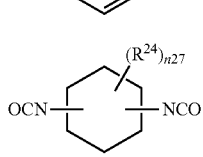

Chemical Formula 13

Chemical Formula 17

Chemical Formula 18

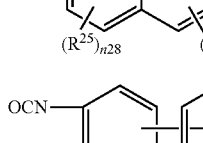

Chemical Formula 14

Chemical Formula 19

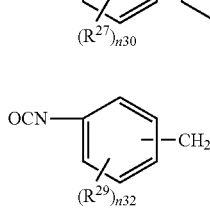

In Chemical Formulae 15 to 19, $R^{23}$ to $R^{30}$ are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, and n26, n30, n31, n32, and n33 are each independently integers of from 0 to 4, n27 is an integer of from 0 to 10, and n28 and n29 are each independently integers of from 0 to 3.

In the polyimide precursor composition, the polyamic acid may further include a repeating unit represented by the following Chemical Formula 20.

In Chemical Formulae 4 to 14,

Cy is the same as in Chemical Formula 1, $R^4$ to $R^{22}$ are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n7 and n8 are each independently integers of from 0 to 3, n9 and n10 are each independently integers of from 0 to 9, n11 to n22 are each independently integers of from 0 to 3, n23 and n24 are each independently integers of from 0 to 8, and n25 is an integer of from 0 to 10, Specifically, the diisocyanate represented by the above Chemical Formula 2 may include a diisocyanate represented by the following Chemical Formulae 15 to 19, or a combination of at least one of the foregoing.

Chemical Formula 20

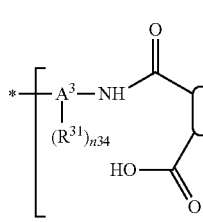

In Chemical Formula 20,

Cy is the same as in Chemical Formula 1, $A^3$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, a substituted or unsubstituted C2 to C40 siloxane, or a combination including at least one of the foregoing, $R^{31}$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n34 is an integer of 0 to 10, and n34 is determined by a valence of $A^3$. It will be appreciated that $A^3$ has a valence of at least 3.

Specifically, when the polyamic acid includes a repeating unit represented by the above Chemical Formula 1 and a repeating unit represented by the above Chemical Formula 20, the polyamic acid may include the repeating unit represented by the above Chemical Formula 1 and the repeating unit represented by the above Chemical Formula 20 in a mole ratio of about 50:50 to about 99.9:0.1 (Chemical Formula 1: Chemical Formula 20).

According to another embodiment, a method of preparing a polyimide is provided that includes combining a hydroxyl group-containing amine compound represented by the following Chemical Formula 23 and an acid dianhydride compound represented by the following Chemical Formula 24 and reacting them to form a polyamic acid, adding the diisocyanate represented by the above Chemical Formula 2 to the polyamic acid to prepare a cross-linked polyamic acid, and imidizing the cross-linked polyamic acid to prepare a polyimide. Here, the diisocyanate represented by the above Chemical Formula 2 is added in an amount of about 0.01 moles to about 10 moles based on 100 moles of the hydroxyl group-containing amine compound represented by the following Chemical Formula 23.

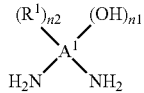

Chemical Formula 23

In Chemical Formula 23, $A^1$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, or a combination including at least one of the foregoing, $R^1$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, and n1 is an integer of 1 or greater, n2 is an integer of from 0 to 10, and n1+n2 is determined by a valence of $A^1$. It will be appreciated that $A^1$ has a valence of at least 3.

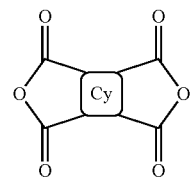

Chemical Formula 24

In Chemical Formula 24,

Cy is the same as in Chemical Formula 1.

The diisocyanate represented by the above Chemical Formula 2 may be added in the amount of about 2 moles to about 7 moles based on 100 moles of the hydroxyl group-containing amine compound represented by the above Chemical Formula 23.

Imidizing the cross-linked polyamic acid may be performed by heat-treating at about 200° C. to about 350° C.

In preparing the polyamic acid, an amine compound represented by the following Chemical Formula 22 may be further added to the combination of the hydroxyl group-containing amine compound represented by Chemical Formula 23 and the acid dianhydride compound represented by Chemical Formula 24.

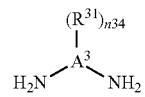

Chemical Formula 22

In Chemical Formula 22, $A^3$, $R^{31}$, and n34 are the same as in Chemical Formula 20.

According to an embodiment, in preparing the polyamic acid, the hydroxyl group-containing amine compound represented by the above Chemical Formula 23 and the amine compound represented by the above Chemical Formula 22 may be combined in a mole ratio of about 50:50 to about 99.9:0.1 (Chemical Formula 23: Chemical Formula 22).

The cross-linked polyamic acid may include a repeating unit represented by the following Chemical Formula 25.

Chemical Formula 25

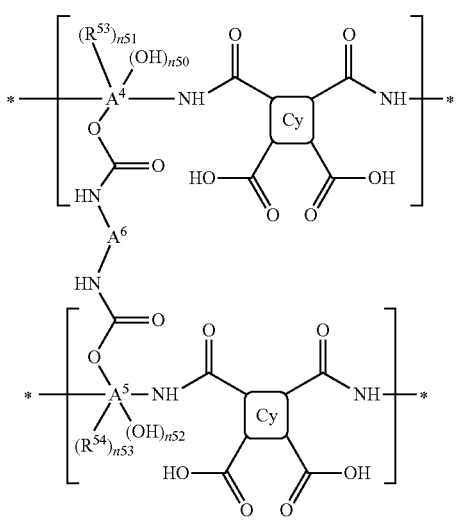

In Chemical Formula 25,

Cy is the same as in Chemical Formula 1, $A^4$ and $A^5$ are the same or different and are each independently a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, a substituted or unsubstituted C2 to C40 siloxane, or a combination including at least one of the foregoing, $R^{53}$ and $R^{54}$ are the same or different and are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n50 and n52 are integers of 0 or greater, n51 and n53 are integers of from 0 to 10, n50+n51 is determined by a valence of $A^4$, n52+n53 is determined by a valence of $A^5$, and $A^6$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, or a combination including at least one of the foregoing. It will be appreciated that $A^4$ and $A^5$ each has a valence of at least 3.

According to yet another embodiment of this disclosure, a polyimide prepared by using the method of preparing a polyimide is provided.

The polyimide may include a repeating unit represented by the following Chemical Formula 26.

Chemical Formula 26

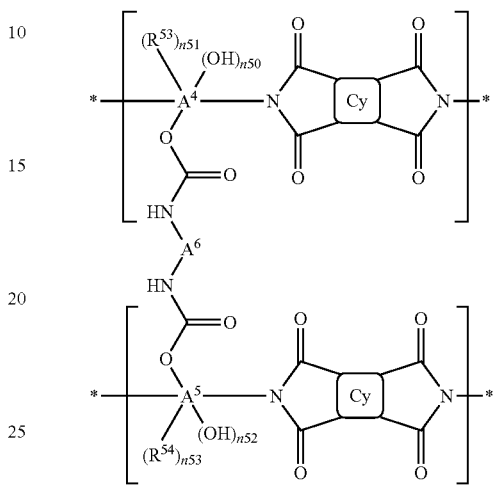

In Chemical Formula 26,

Cy is the same as in Chemical Formula 1, and $A^4$, $A^5$, $A^6$, $R^{53}$, $R^{54}$, n50, n51, n52, and n53 are the same as in the above Chemical Formula 25.

According to still another embodiment of this disclosure, a film including the polyimide is provided.

The film may be applied as a transparent plastic substrate.

The film may have a coefficient of thermal expansion of about 3 parts-per-million per degree Celsius (ppm/° C.) to about 100 ppm/° C.

Also, the film may have a light transmittance to light of a visible wavelength of about 50 percent (%) or greater.

Hereinafter, further embodiments will be described in detail.

BRIEF DESCRIPTION OF THE DRAWINGS

The above and other aspects, advantages, and features of this disclosure will become more apparent by describing in further detail exemplary embodiments thereof with reference to the accompanying drawings, in which.

DETAILED DESCRIPTION

Figure 1:
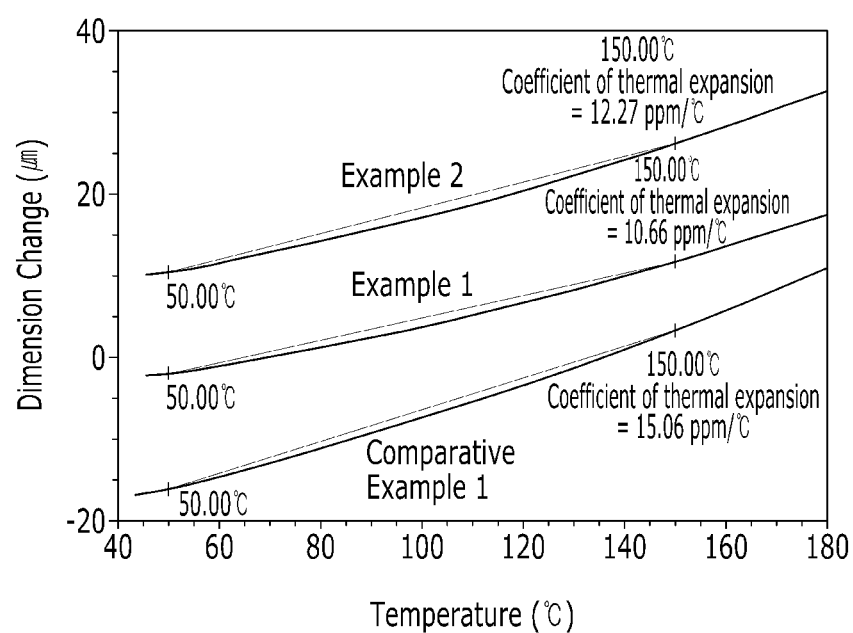
FIG. 1 is a graph showing dimension change (micrometers, μm) versus temperature (degrees Celsius, ° C.) and respective coefficients of thermal expansion for Example 1, Example 2, and Comparative Example 1.

This disclosure will be described more fully hereinafter with reference to the accompanying drawings, in which various embodiments are shown. This disclosure may, however, be embodied in many different forms and should not be construed as limited to the exemplary embodiments set forth herein. Rather, these embodiments are provided so that this disclosure will be thorough and complete and will fully convey the scope of the invention to those skilled in the art.

The terminology used herein is for the purpose of describing particular embodiments only and is not intended to be limiting. As used herein, the singular forms "a," "an," and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

As used herein, "Alkyl" refers to a straight or branched chain saturated aliphatic hydrocarbon having the specified number of carbon atoms. "Alkoxy" refers to an alkyl moiety that is linked via an oxygen (i.e., —O-alkyl). The term "alkylene" refers to a straight, branched or cyclic divalent aliphatic hydrocarbon group. As used herein, "aryl" means a cyclic moiety in which all ring members are carbon and at least one ring is aromatic. More than one ring may be present, and any additional rings may be independently aromatic, saturated or partially unsaturated, and may be fused, pendant, spirocyclic or a combination thereof. "Aralkyl" means a cyclic moiety in which all ring members are carbon and at least one ring is aromatic, and an alkylene group is included in the connectivity. As used herein, the term "arylene" refers to a divalent radical formed by the removal of two hydrogen atoms from one or more rings of an aromatic hydrocarbon, wherein the hydrogen atoms may be removed from the same or different rings (preferably different rings), each of which rings may be aromatic or nonaromatic. As used herein, the term "aralkylene" refers to a divalent radical formed by the removal of two hydrogen atoms from one or more rings of an aromatic hydrocarbon, wherein the hydrogen atoms may be removed from the same or different rings (preferably different rings), each of which rings may be aromatic or nonaromatic, and insertion of an alkylene group. As used herein, "amino" has the general formula —N(R)$_2$, wherein each R is independently hydrogen, an alkyl group, or an aryl group. As used herein, "Alkylamino" refers to an alkyl group that is linked via an amino group (i.e., -amino-alkyl). "Aryloxy" refers to an aryl moiety that is linked via an oxygen (i.e., —O-aryl). "Aralkyloxy" refers to an aralkyl moiety that is linked via an oxygen (i.e., —O-aryl). "Cycloalkylene" refers to a divalent radical formed by the removal of two hydrogen atoms from one or more rings of a cycloalkyl group (a nonaromatic hydrocarbon that includes at least one ring). "Cycloalkyloxy" refers to a cycloalkyl moiety that is linked via an oxygen atom (i.e., —O-cycloalkyl). A "heteroalkyl" group is an alkyl group that includes at least one heteroatom covalently bonded to one or more carbon atoms of the alkyl group. A "heterocycloalkyl" group is a cycloalkyl group that includes at least one heteroatom covalently bonded to one or more carbon atoms in at least one ring of the cycloalkyl group. "Heterocycloalkylene" refers to a divalent radical formed by the removal of two hydrogen atoms from one or more rings of a heterocycloalkyl group. A "heteroaryl" group is a monovalent carbocyclic ring system that includes one or more aromatic rings, in which at least one ring member (e.g., one, two or three ring members) is a heteroatom. A "heteroaralkyl" group is a monovalent carbocyclic ring system that includes one or more aromatic rings and an alkylene group in the connectivity, in which at least one ring member (e.g., one, two or three ring members) is a heteroatom. "Heteroarylene" refers to a divalent radical formed by the removal of two hydrogen atoms from one or more rings of a heteroaryl moiety, wherein the hydrogen atoms may be removed from the same or different rings (preferably the same ring), each of which rings may be aromatic or nonaromatic. "Heteroarylene" refers to a divalent radical formed by the removal of two hydrogen atoms from one or more rings of a heteroaryl moiety, wherein the hydrogen atoms may be removed from the same or different rings (preferably the same ring), each of which rings may be aromatic or nonaromatic, and insertion of an alkylene group. "Cyclo" refers to a moiety having a ring structure, where multiple rings, if present, may be pendant, spiro or fused. "Fluoroalkyl" refers to an alkyl group in which at least one hydrogen is replaced with fluorine.

As used herein, when a definition is not otherwise provided, the term "C4 to C20 carbocyclic group" may refer to a monocyclic aromatic group or a fused form of monocyclic aromatic groups. The carbocyclic group may have a substituent such as a halogen, a C1 to C20 haloalkyl group, a nitro group, a cyano group, a C1 to C20 alkoxy group, a C1 to C10 lower alkylamino group, or a combination including at least one of the foregoing.

As used herein, when a definition is not otherwise provided, the term "C6 to C20 monocyclic aromatic group" may be a singular form or a fused form, and indicates a C6 to C20 carbocycle aromatic system including a cycle. The monocyclic aromatic group may have a substituent such as a halogen, a C1 to C20 haloalkyl group, a nitro group, a cyano group, a C1 to C20 alkoxy group, a C1 to C10 lower alkylamino group, or a combination including at least one of the foregoing.

As used herein, when a definition is not otherwise provided, the term "C2 to C20 condensed polycyclic aromatic group" indicates cycles condensed with one another, and the condensed cyclic aromatic group may have a substituent such as a halogen, a C1 to C20 haloalkyl group, a nitro group, a cyano group, a C1 to C20 alkoxy group, a C1 to C10 lower alkylamino group, or a combination including at least one of the foregoing.

As used herein, when a definition is not otherwise provided, the term "C2 to C20 non-condensed polycyclic aromatic groups that are linked to each other through an aromatic group" indicates an aromatic system including several cycles linked to one another directly or by a linking group such as an aromatic group. The linking group may include a C1 to C10 alkylene group, a C1 to C10 alkylene group substituted by a C1 to C10 alkyl group or a C1 to C10 fluoroalkyl group, SO$_2$, C(=O), O, and the like. The C2 to C20 non-condensed polycyclic aromatic groups that are linked to each other through an aromatic group may have a substituent such as a halogen, a C1 to C20 haloalkyl group, a nitro group, a cyano group, a C1 to C20 alkoxy group, a C1 to C10 lower alkylamino group, or a combination including at least one of the foregoing.

As used herein, when a definition is not otherwise provided, the term "C2 to C40 siloxane" refers to a group including carbon and a backbone including at least one silicon bound to at least one oxygen such as —SiO—. The silicon-oxygen bond may be a single or double bond. "Siloxane" may further include polysiloxanes.

As used herein, when a definition is not otherwise provided, the term "substituted" may refer to a substituent including a halogen, a C1 to C15 haloalkyl group, a nitro group, a cyano group, a C1 to C15 alkoxy group, a C1 to C10 lower alkylamino group, or a combination including at least one of the foregoing.

As used herein, when a definition is not otherwise provided, the term "hetero" may refer to a functional group including 1 to 3 heteroatoms including N, O, S, P, Si, or a combination including at least one of the foregoing.

As used herein, when a definition is not otherwise provided, the term "combination" may refer to a blend, a mixture, a reaction product, or a copolymer. "Copolymerization" may refer to graft polymerization, block copolymerization, alternating copolymerization, or random copolymerization. "Copolymer" may refer to a graft copolymer, a block copolymer, an alternating copolymer, or a random copolymer.

Also, an asterisk (i.e., "*") denotes a point of attachment, e.g., a position linked to the same or different atom or chemical formula.

According to an embodiment, a polyimide precursor composition is provided that includes a polyamic acid including a repeating unit represented by the following Chemical Formula 1 and a diisocyanate represented by the following Chemical Formula 2. Herein, the diisocyanate represented by Chemical Formula 2 may be included in an amount of less than about 10 moles based on 100 moles of the repeating unit represented by Chemical Formula 1 in the polyamic acid, specifically about 0.01 moles to about 10 moles, and more specifically about 2 moles to about 7 moles.

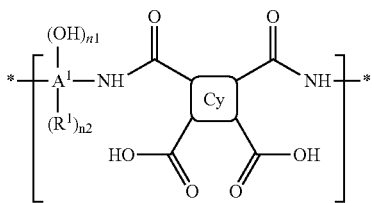

Chemical Formula 1

In Chemical Formula 1,

Cy is the same or different in each repeating unit, and each Cy is independently a tetravalent functional group including a substituted or unsubstituted C4 to C20 carbocyclic group, a substituted or unsubstituted C6 to C20 monocyclic aromatic group, a substituted or unsubstituted C2 to C20 condensed polycyclic aromatic group, C2 to C20 non-condensed polycyclic aromatic groups linked to each other through a substituted or unsubstituted aromatic group, or a combination including at least one of the foregoing, $A^1$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, a substituted or unsubstituted C2 to C40 siloxane, or a combination including at least one of the foregoing, $R^1$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n1 is an integer of 1 or greater, specifically 2 or greater, and more specifically 2, n2 is an integer of from 0 to 10, and n1+n2 is determined by a valence of $A^1$. It will be appreciated that $A^1$ has a valence of at least 3.

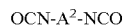 OCN-$A^2$-NCO            Chemical Formula 2

In Chemical Formula 2, $A^2$ is a substituted or unsubstituted C1 to C20 alkylene group, a substituted or unsubstituted C5 to C40 arylene group, a substituted or unsubstituted C3 to C40 heteroarylene group, a substituted or unsubstituted C5 to C40 cycloalkylene group, or a substituted or unsubstituted C5 to C40 heterocycloalkylene group, and specifically a substituted or unsubstituted C5 to C40 arylene group or a substituted or unsubstituted C5 to C40 cycloalkylene group.

The repeating unit represented by the above Chemical Formula 1 may be imidized to provide a polyimide. Since the polyimide precursor composition includes a small amount of diisocyanate from the introduction of the diisocyanate represented by Chemical Formula 2, a part of the repeating unit constituting the polyimide may be effectively cross-linked by the diisocyanate moiety. By cross-linking a portion of the polyimide repeating units, a film including the polyimide may simultaneously have excellent mechanical characteristics and excellent flexibility so that the film may be formed in a stable form that is resistant to mechanical or physical damage such as tearing, ripping, or fragmenting into pieces.

Also, since the film has a decreased coefficient of thermal expansion (CTE), the thermal stability may be improved. Further, the excellent optical transmittance that plastics have may be maintained.

As noted above, more specifically, in the polyimide precursor composition, the diisocyanate represented by the above Chemical Formula 2 may be included in an amount of about 2 moles to about 7 moles based on 100 moles of the repeating unit represented by the above Chemical Formula 1 in the polyamic acid. In this case, the polyimide precursor composition may form a film having excellent mechanical characteristics, flexibility, thermal stability, and optical transmittance.

In an exemplary embodiment, the repeating unit represented by the above Chemical Formula 1 may include a repeating unit represented by Chemical Formula 3, but is not limited thereto.

Chemical Formula 3

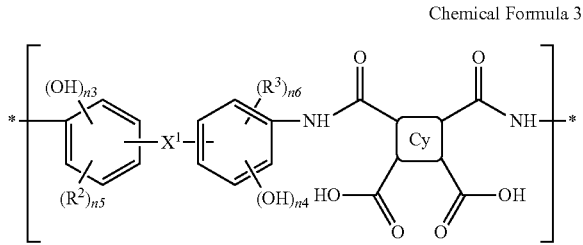

Chemical Formula 5

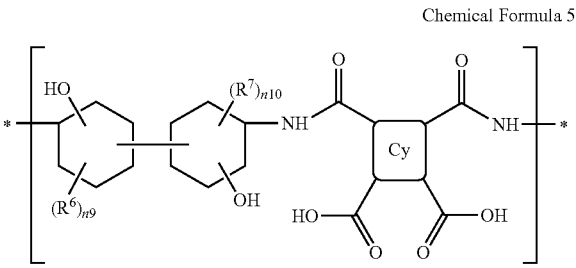

Chemical Formula 6

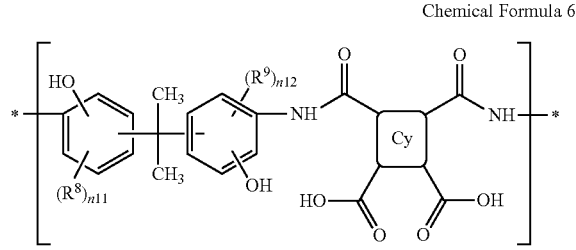

In Chemical Formula 3,

Cy is the same as in Chemical Formula 1, $X^1$ is a single bond, $(CR^{200}R^{201})_{k1}$ (wherein $R^{200}$ and $R^{201}$ are the same or different and are independently hydrogen, a hydroxyl group, a C1 to C10 alkyl group, or a C1 to C10 fluoroalkyl group, and k1 is an integer of from 1 to 5), $SO_2$, O, C(=O), or a combination thereof, $R^2$ and $R^3$ are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n3 to n6 are each independently integers of from 0 to 4, and specifically n3 and n4 are each independently integers of 1 or 2, n3+n5 is an integer of from 0 to 4, n4+n6 is an integer of from 0 to 4, and n3+n4 is an integer of from 1 to 8, specifically an integer of from 2 to 4, and more specifically an integer of 2.

More specifically, the repeating unit represented by the above Chemical Formula 1 may include repeating units represented by the following Chemical Formulae 4 to 14, or a combination of at least one of the foregoing, but is not limited thereto.

Chemical Formula 7

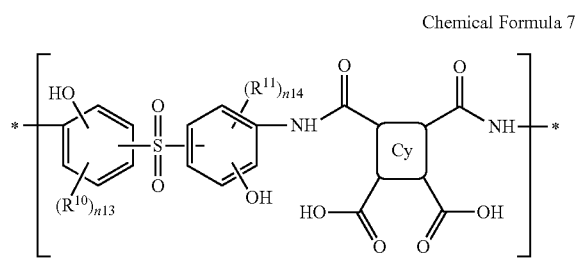

Chemical Formula 8

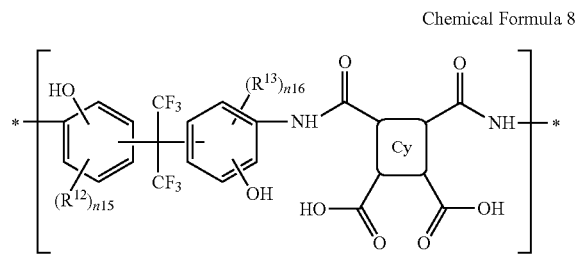

Chemical Formula 9

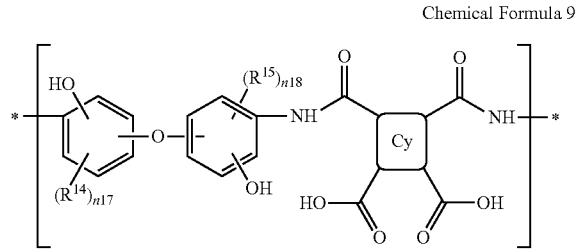

Chemical Formula 4

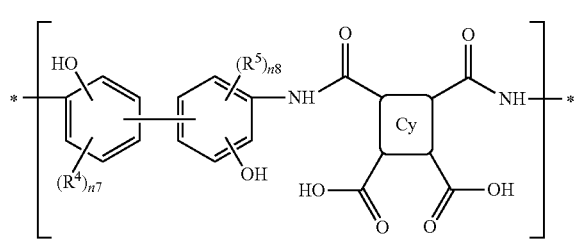

Chemical Formula 10

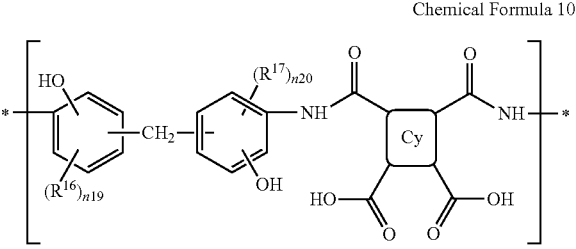

Chemical Formula 11

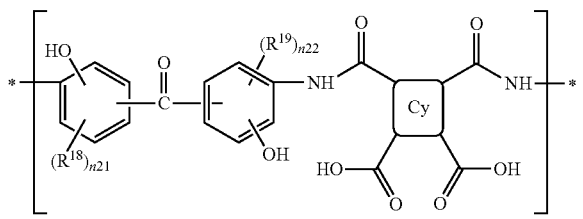

Chemical Formula 12

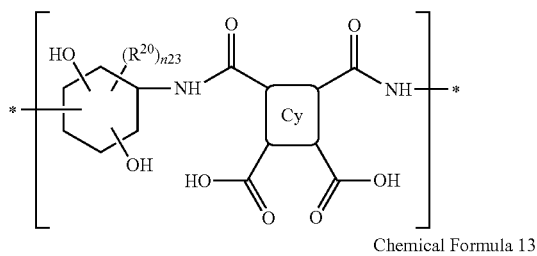

Chemical Formula 13

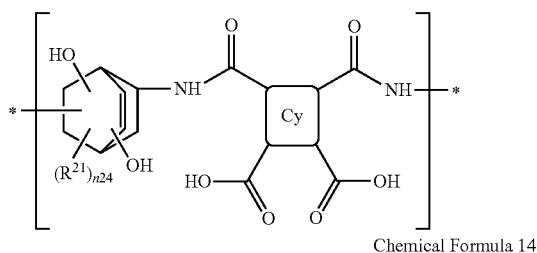

Chemical Formula 14

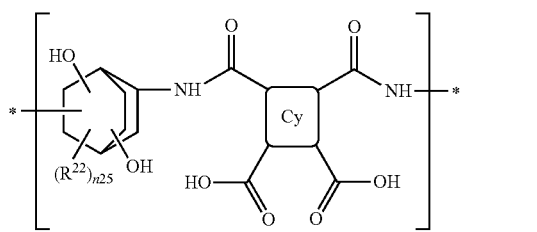

In Chemical Formulae 4 to 14,

Cy is the same as in Chemical Formula 1, $R^4$ to $R^{22}$ are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n7 and n8 are each independently integers of from 0 to 3,
n9 and n10 are each independently integers of from 0 to 9,
n11 to n22 are each independently integers of from 0 to 3,
n23 and n24 are each independently integers of from 0 to 8, and
n25 is an integer of from 0 to 10.

The diisocyanate represented by the above Chemical Formula 2 may include a diisocyanate represented by the following Chemical Formulae 15 to 19, or a combination of at least one of the foregoing, but is not limited thereto.

Chemical Formula 15

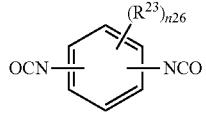

Chemical Formula 16

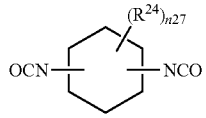

Chemical Formula 17

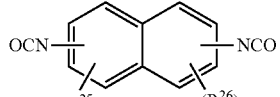

Chemical Formula 18

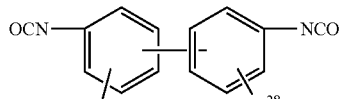

Chemical Formula 19

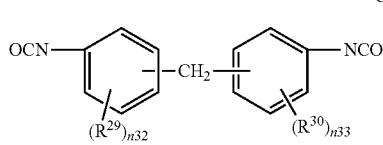

In Chemical Formulae 15 to 19, $R^{23}$ to $R^{30}$ are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, and n26, n30, n31, n32, and n33 are each independently integers of from 0 to 4,
n27 is an integer of from 0 to 10, and
n28 and n29 are each independently integers of from 0 to 3.

Specific examples of the diisocyanate represented by the above Chemical Formula 2 may include, but are not limited to, 1,4-phenylene diisocyanate ("PDI"), 1,4-cyclohexane diisocyanate ("CDI"), a xylene diisocyanate, 4,4'-diphenyl methane diisocyanate, 1,5-naphthalene diisocyanate, 2,6-toluene diisocyanate, 2,4-toluene diisocyanate, 4,4'-dicyclohexylmethane diisocyanate ("H12MDI"), trans-1,4-cyclohexane diisocyanate ("CHDI"), 1,3-cyclohexyl diisocyanate, isophorone diisocyanate ("IPDI"), 2,2'-dimethyl-1,5-pentamethylene diisocyanate, 3-methoxy-1,6-hexamethylene diisocyanate, 3-butoxy-1,6-hexamethylene diisocyanate, omega, omega'-dipropylether diisocyanate, trimethylhexamethylene diisocyanate, tetramethyl-1,3-xylene diisocyanate ("TMXDI"), dimethyl diisocyanate ("DDI"), 1,4-tetramethylene diisocyanate, 1,5-pentamethylene diisocyanate, 2,2,4- trimethyl-1,5-pentamethylene diisocyanate, 1,6-hexamethylene diisocyanate ("HMDI"), 1,7-heptamethylene diisocyanate, 1,8-octamethylene diisocyanate, 1,9-nonamethylene diisocyanate, 1,10-decamethylene diisocyanate, 1,1,6,6-tetrahydroperfluoro-hexamethylene diisocyanate ("THFDI"), or a combination including at least one of the foregoing.

In an exemplary embodiment of the polyimide precursor composition, the polyamic acid may further include a repeating unit represented by the following Chemical Formula 20. In an embodiment where the polyamic acid further includes a repeating unit represented by the following Chemical Formula 20, diverse compositions of the polyamic acid may be used for the polyimide precursor composition.

Chemical Formula 20

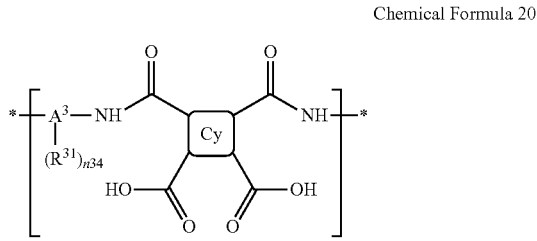

In Chemical Formula 20,

Cy is the same as in Chemical Formula 1, $A^3$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, a substituted or unsubstituted C2 to C40 siloxane, or a combination including at least one of the foregoing, and specifically a substituted or unsubstituted C5 to C40 arylene group, $R^{31}$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n34 is an integer ranging from 0 to 10, and n34 is determined by a valence of $A^3$. It will be appreciated that $A^3$ has a valence of at least 3.

A functional group represented by the following Chemical Formula 21, which is included in the repeating unit represented by the above Chemical Formula 20, may be from a precursor such as an amine compound represented by the following Chemical Formula 22.

Chemical Formula 21

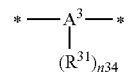

In Chemical Formula 21,
$A^3$, $R^{31}$, and n34 are the same as in Chemical Formula 20.

Chemical Formula 22

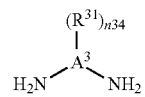

In Chemical Formula 22,
$A^3$, $R^{31}$, and n34 are the same as in Chemical Formula 20.

Specifically, the amine compound represented by the above Chemical Formula 22 may be a compound represented by the following chemical formulae or a combination including at least one of the foregoing, but is not limited thereto.

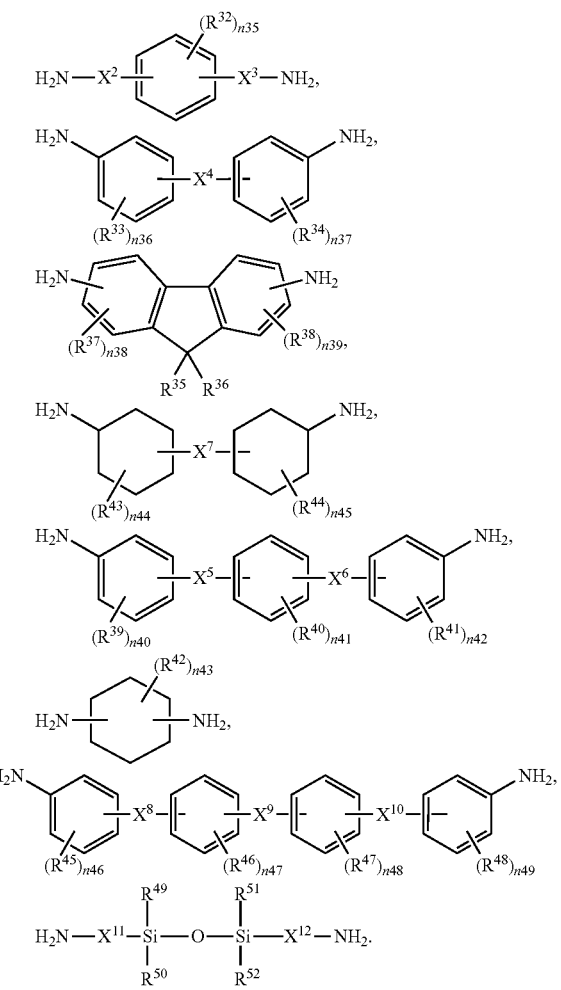

In the chemical formulae, $R^{32}$ to $R^{52}$ are the same or different and are each independently hydrogen, a halogen, a nitro, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, $X^2$ to $X^{12}$ are the same or different and are each independently a single bond, a substituted or unsubstituted C1 to C10 alkylene group, a substituted or unsubstituted C1 to C10 cycloalkylene group, a substituted or unsubstituted C6 to C15 arylene group, $SO_2$, O, C(=O), or a combination including at least one of the foregoing, n35 to n37, n40 to n42, and n46 to n49 are integers of from 0 to 4, n38 and n39 are integers of from 0 to 3, and n43, n44, and n45 are integers of from 0 to 10.

More specifically, the amine compound represented by the above Chemical Formula 22 may be a compound represented by the following chemical formulae or a combination including at least one of the foregoing, but is not limited thereto.

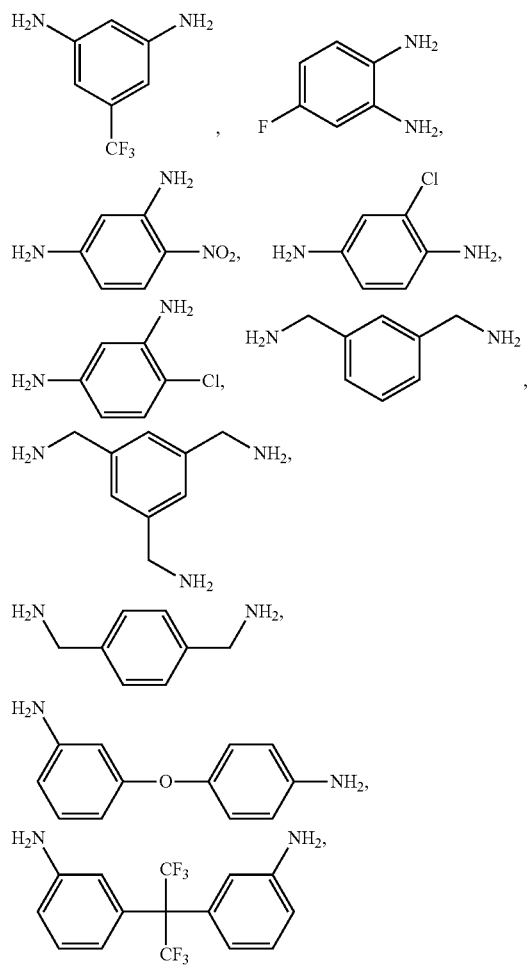
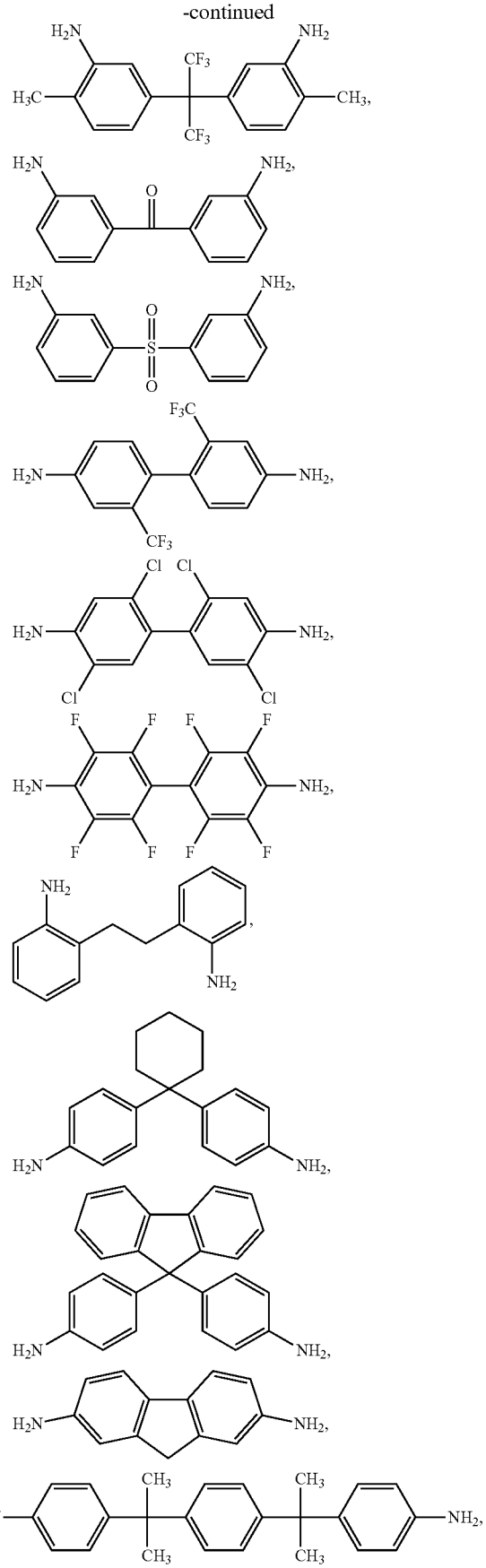

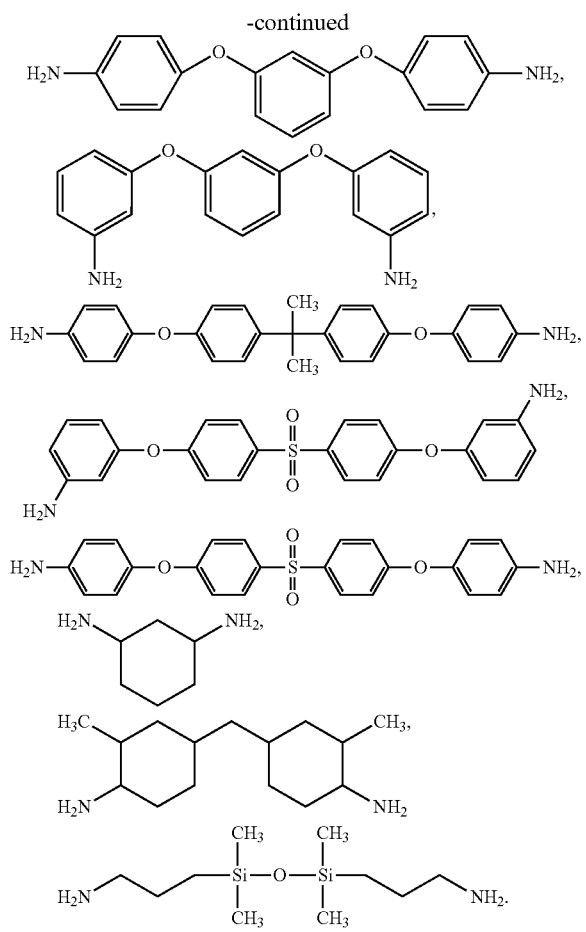

In an exemplary embodiment of the polyimide precursor composition, when the polyamic acid includes the repeating unit represented by the above Chemical Formula 1 and the repeating unit represented by the above Chemical Formula 20, the repeating unit represented by the above Chemical Formula 1 and the repeating unit represented by the above Chemical Formula 20 may be included in a mole ratio of about 50:50 to about 99.9:0.1 (Chemical Formula 1: Chemical Formula 2), specifically a mole ratio of about 60:40 to about 99:1, and more specifically a mole ratio of about 70:30 to about 90:10. When the repeating unit represented by the above Chemical Formula 1 and the repeating unit represented by the above Chemical Formula 20 are included within these ranges, cross-linking of the repeating units caused by the diisocyanate may occur in a selected amount.

In an exemplary embodiment, cross-linking may occur between repeating units represented by Chemical Formula 1. In another exemplary embodiment, cross-linking may occur between repeating units represented by Chemical Formula 20. In yet another exemplary embodiment, cross-linking may occur between repeating units represented by Chemical Formula 1 and Chemical Formula 20. In a further exemplary embodiment, cross-linking may occur between any combination of repeating units represented by Chemical Formula 1 and Chemical Formula 20. Thus, the film including the polyimide prepared by using the polyimide precursor composition may be stably prepared in such a manner that the film is resistant to mechanical or physical damage such as tearing, ripping, or fragmenting into pieces. Also, the coefficient of thermal expansion of the film including the polyimide may be sufficiently low to afford appreciable heat resistance.

In an exemplary embodiment, the polyamic acid may include more of the repeating unit represented by the above Chemical Formula 20 than the repeating unit represented by the above Chemical Formula 1 so that the repeating units represented by the above Chemical Formula 1 may not be arranged close to one another. Thus, the repeating units represented by the above Chemical Formula 1 may be difficult to cross-link through the diisocyanate moiety. In this case, the film may be formed to be resistant to mechanical or physical damage, but the coefficient of thermal expansion of the film may decrease slightly with respect to a film with a higher degree of cross-linking.

According to an embodiment, the repeating unit represented by the above Chemical Formula 1 and the repeating unit represented by the above Chemical Formula 20 may be included in a mole ratio of about 70:30 to about 99:1 (Chemical Formula 1:Chemical Formula 20), and according to another embodiment, they may be included at a mole ratio of about 80:20 to about 99:1 (Chemical Formula 1:Chemical Formula 20).

In an exemplary embodiment, the polyimide precursor composition may further include an organic solvent to provide the polyimide precursor composition with excellent coating characteristics. A surface that may be coated by the polyimide precursor composition include, for example, a plastic, a metal, a ceramic, or a combination of at least one of the foregoing, but is not limited thereto. Examples of the organic solvent may include dimethylsulfoxide; N-methyl-2-pyrrolidone; N,N-dimethyl formamide ("DMF"); N,N-dimethyl acetamide ("DMAc"); N-methylformamide ("NMF"); an alcohol such as methanol, ethanol, 2-methyl-1-butanol, and 2-methyl-2-butanol; a ketone such as γ-butyrolactone, cyclohexanone, 3-hexanone, 3-heptanone, 3-octanone, acetone, and methyl ethyl ketone; tetrahydrofuran; trichloroethane; or a combination of at least one of the foregoing, but are not limited thereto. These solvents may be used alone, or two or more of them may be used together.

According to another embodiment, a method of preparing a polyimide includes combining a hydroxyl group-containing amine compound represented by the following Chemical Formula 23 and an acid dianhydride compound represented by the following Chemical Formula 24 and reacting them to prepare a polyamic acid; adding the diisocyanate represented by the above Chemical Formula 2 to the polyamic acid and cross-linking the polyamic acid to prepare a cross-linked polyamic acid; and imidizing the cross-linked polyamic acid to prepare a polyimide. Herein, the diisocyanate represented by the above Chemical Formula 2 may be included in an amount of less than about 10 moles based on 100 moles of the hydroxyl group-containing amine compound represented by the following Chemical Formula 23. According to another embodiment, the diisocyanate may be included in an amount of about 0.01 moles to about 10 moles based on 100 moles of the hydroxyl group-containing amine compound represented by the following Chemical Formula 23. According to yet another embodiment, the diisocyanate represented by the above Chemical Formula 2 may be included in an amount of about 2 moles to about 7 moles based on 100 moles of the hydroxyl group-containing amine compound represented by the following Chemical Formula 23. When the amount of the diisocyanate represented by the above Chemical Formula 2 is in any of the above ranges, the film produced may have the properties as described above.

Chemical Formula 23

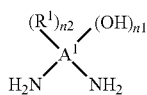

In Chemical Formula 23, $A^1$, $R^1$, n1, and n2 are the same as in Chemical Formula 1.

Examples of the hydroxyl group-containing amine compound represented by Chemical Formula 23 include 3,3'-dihydroxy benzidine ("DHBZ"), 2,2-bis(3-hydroxy-4-aminophenyl) hexafluoropropane, or a combination including at least one of the foregoing, but are not limited thereto. It will be appreciated herein that combinations include combinations of one or more hydroxyl group containing amine compounds and one or more non-hydroxyl group-containing compounds.

Chemical Formula 24

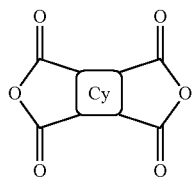

In Chemical Formula 24,

Cy is the same as in Chemical Formula 1.

The acid dianhydride compound represented by the above Chemical Formula 24 includes 3,3',4,4'-biphenyl tetracarboxylic dianhydride ("BPDA"), bicyclo[2.2.2]oct-7-ene-2,3,5,6-tetracarboxylic dianhydride ("BTDA"), 3,3',4,4'-diphenylsulfone tetracarboxylic dianhydride ("DSDA"), 4,4'-(hexafluoroisopropylidene) diphthalic anhydride ("6FDA"), 4,4'-oxydiphthalic anhydride ("ODPA"), pyromellitic dianhydride ("PMDA"), 4-(2,5-dioxotetrahydrofuran-3-yl)-1,2,3,4-tetranaphthalene-1,2-dicarboxylic anhydride ("DTDA"), and the like, or a combination including at least one of the foregoing, but is not limited thereto. One or a combination of two or more of these may be used in a reaction with the amine compound represented by the above Chemical Formula 23.

The reaction between the amine compound represented by the above Chemical Formula 23 and the acid dianhydride compound represented by the above Chemical Formula 24 may be performed with or without a catalyst, where the optical transparency of a substrate may be improved by not using a catalyst.

In the preparation of the polyamic acid, the diamine represented by the above Chemical Formula 22 may be a combination of several different diamines represented by the above Chemical Formula 22.

The description of the diamine represented by the above Chemical Formula 22 is substantially the same as above hereinafter, unless further description is given.

In an exemplary embodiment, the polyamic acid may further include a moiety of the diamine represented by the above Chemical Formula 22 so that different polyamic acids of diverse compositions may be used for the preparation of the polyimide.

In the preparation of the polyamic acid, when the hydroxyl group-containing amine compound represented by the above Chemical Formula 23 and the amine compound represented by the above Chemical Formula 22 are combined and used, the hydroxyl group-containing amine compound represented by the above Chemical Formula 23 and the amine compound represented by the above Chemical Formula 22 may be present in a mole ratio of about 50:50 to about 99.9:0.1 (Chemical Formula 23:Chemical Formula 22), specifically a mole ratio of about 60:40 to about 99:1, and more specifically a mole ratio of about 70:30 to about 90:10. When the hydroxyl group-containing amine compound represented by the above Chemical Formula 23 and the amine compound represented by the above Chemical Formula 22 are present in the above ratios, cross-linking by the diisocyanate may occur in a selected amount. Therefore, the film including the polyimide prepared by the method of preparing the polyimide may be stably formed such that the film is resistant to mechanical or physical damage such as tearing, ripping, or fragmenting into pieces. Also, the coefficient of thermal expansion of the film including the polyimide may be effectively decreased, and film's the heat resistance may be improved.

In another exemplary embodiment, in the preparation of the polyamic acid, if more of the amine compound represented by the above Chemical Formula 22 is used than the hydroxyl group-containing amine compound represented by the above Chemical Formula 23, repeating units including a functional group derived from the hydroxyl group-containing amine compound represented by the above Chemical Formula 23 may not be arranged close to one another. Thus, fewer of the repeating units may be cross-linked through the diisocyanate moiety. In this case, the film may be formed to be resistant to mechanical or physical damage, but the coefficient of thermal expansion of the film may not be less than that of a film with a higher degree of cross-linking.

According to one embodiment, the hydroxyl group-containing amine compound represented by the above Chemical Formula 23 and the amine compound represented by the above Chemical Formula 22 may be used in a mole ratio of about 70:30 to about 99:1 (Chemical Formula 23:Chemical Formula 22). According to another embodiment, they may be used in a mole ratio of about 80:20 to about 99:1.

In an exemplary embodiment, in the preparation of the polyamic acid, an organic solvent may be used such as N-methylpyrrolidone, N,N-dimethylformamide, N,N-diethylformamide, N,N-dimethylacetamide (DMAc), N-methylcaprolactam, N-methylpropionamide, dimethylsulfoxide, pyridine, tetrahydrofuran, cyclohexanone, 1,4-dioxane, or other polar aprotic solvents may be used, but this disclosure is not limited thereto. The organic solvents may be used alone or in a combination of two or more of them.

In another exemplary embodiment, in the preparation of the cross-linked polyamic acid, when the diisocyanate is added, an amine compound such as triethylamine may be added as a catalyst. This disclosure, however, is not limited thereto. In yet another embodiment, no catalyst may be added.

The cross-linked polyamic acid may include a repeating unit represented by the following Chemical Formula 25, which shows that a part of the repeating unit is cross-linked by using a select amount of diisocyanate.

Chemical Formula 25

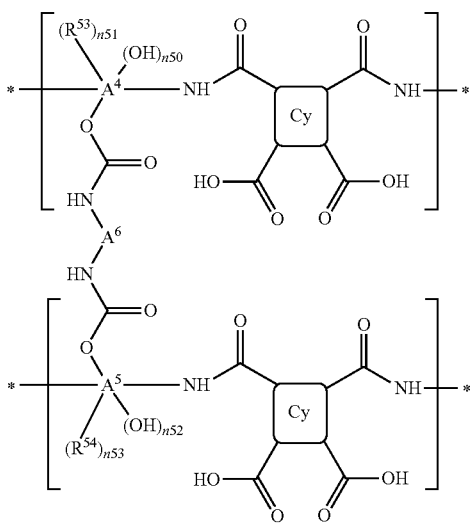

In Chemical Formula 25,

Cy is the same as in Chemical Formula 1, $A^4$ and $A^5$ are the same or different and are each independently a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, a substituted or unsubstituted C2 to C40 siloxane, or a combination including at least one of the foregoing, $R^{53}$ and $R^{54}$ are the same or different and are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination including at least one of the foregoing, n50 and n52 are integers of from 0 or greater, specifically of from 1 or greater, and more specifically 1, n51 and n53 are integers of from 0 to 10, specifically of from 1 to 9, and more specifically of from 2 to 8, n50+n51 is determined by a valence of $A^4$, n52+n53 is determined by a valence of $A^5$, and $A^6$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C4 to C40 heteroaralkylene group, a substituted or unsubstituted C5 to C40 cycloalkylene group, a substituted or unsubstituted C5 to C40 heterocycloalkylene group, or a combination including at least one of the foregoing. It will be appreciated that $A^4$ and $A^5$ each has a valence of at least 3.

In the method of preparing a polyimide, the imidizing the cross-linked polyamic acid to prepare a polyimide may be performed by dehydrating using a dehydrating agent or conditions, such as azeotropic distillation, or by heat-treating. Heat treating may be carried out at a temperature of about 200° C. to about 350° C., more specifically about 225° C. to about 325° C., and more specifically about 250° C. to about 300° C. In an exemplary embodiment, imidizing the cross-linked polyamic acid within these temperatures may effectively transform the polyamic acid to a polyimide, and the film including the polyimide may effectively maintain the same or similar excellent optical transmission and flexibility properties. According to another embodiment, the imidizing may be performed by heat-treating at a temperature of about 230° C. to about 270° C.

According to another embodiment of this disclosure, a polyimide may be prepared according to the polyimide preparation method. The prepared polyimide may include a repeating unit represented by the following Chemical Formula 26, which shows a part of the repeating unit that is cross-linked by using a select amount of diisocyanate. As a result of the cross-linking, the polyimide may simultaneously have excellent thermal stability as well as excellent optical transmittance.

Chemical Formula 26

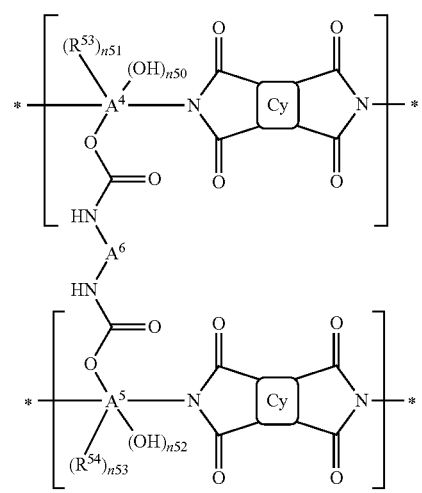

In Chemical Formula 26,

Cy is the same as in Chemical Formula 1, and $A^4$, $A^5$, $A^6$, $R^{53}$, $R^{54}$, n50, n51, n52, and n53 are the same as in the above Chemical Formula 25.

Another embodiment of this disclosure provides a film including the polyimide.

The film including polyimide may be used in applications such as a substrate for a device, an optical film, an integrated circuit ("IC") package, an adhesive film, a multi-layer flexible printed circuit ("FPC"), tape, an insulating film, and the like. According to an embodiment, the film may be used for a transparent plastic substrate.

The film may have a coefficient of thermal expansion of about 3 parts-per-million per degree Celsius (ppm/° C.) to about 100 ppm/° C. When the film has a coefficient of thermal expansion in this range, the thermal characteristics of a substrate including the film may be improved. According to an embodiment, the film may have a coefficient of thermal expansion of about 3 ppm/° C. to about 50 ppm/° C. According to another embodiment, the film may have a coefficient of thermal expansion of about 3 ppm/° C. to about 30 ppm/° C., According to yet another embodiment, it may have a coefficient of thermal expansion of about 3 ppm/° C. to about 15 ppm/° C. Herein, the coefficient of thermal expansion may be a value measured by varying the temperature from about 50° C. to about 150° C.

The light transmittance of the film for light of a visible wavelength, which may be a region ranging from about 400 nanometers (nm) to about 750 nm, may be about 50% to about 100%. According to one embodiment, the light transmittance may be about 60% to about 100%. In an exemplary embodiment with the light transmittance of the film in these ranges, the film may be effectively used for a transparent plastic substrate, but is not limited thereto.

EXAMPLES

Hereinafter, this disclosure is illustrated in more detail with reference to examples. However, they are exemplary embodiments and are not intended to be limiting.

Example 1

Preparation of Polyimide Film

A polyamic acid is acquired by combining 3,3'-dihydroxy benzidine (DHBZ) (20 millimoles, mmol) and 3,3',4,4'-biphenyl tetracarboxylic dianhydride (BPDA) (20 mmol) in the presence of N,N-dimethylacetamide (DMAc) solvent in a 500 mL round-bottomed flask, wherein the total weight of 3,3'-dihydroxy benzidine (DHBZ) and 3,3',4,4'-biphenyl tetracarboxylic dianhydride (BPDA) is about 10 weight percent based on the total weight of the mixed solution, purging the contents of the round-bottom flask with nitrogen gas ($N_2$), and allowing the reaction to proceed for about 3 hours at a temperature of from about 0 to 5 degrees Celsius (° C.), and for about 12 hours at a room temperature (about 25° C.).

A cross-linked polyamic acid is prepared by heating the acquired polyamic acid to about 60° C., adding 1,4-phenylene diisocyanate (PDI) (1.0 mmol, which is 5 moles based on 100 moles of DHBZ) as a cross-linking agent and triethylamine (1.0 mmol) as a catalyst while purging with $N_2$, and allowing the reaction to proceed for about 12 hours at about 60° C.

A polyimide film is prepared by coating an octyltrichlorosilane-treated glass substrate with the cross-linked polyamic acid, allowing the coated substrate to stand for about 1 hour while purging the reaction vessel with $N_2$ at about 50° C., subsequently allowing the substrate to stand for about 1 hour under a vacuum at about 80° C., increasing the temperature to about 250° C. at a heating rate of about 1° C./minute (min) under the $N_2$ atmosphere, and heat-treating under the $N_2$ atmosphere for about 1 hour at about 250° C.

Example 2

Preparation of Polyimide Film

A polyimide film is prepared according to the method as of Example 1, except that 1,4-cyclohexane diisocyanate (CDI) (1.0 mmol) is used as the cross-linking agent instead of 1,4-phenylene diisocyanate (PDI) (1.0 mmol in Example 1).

Example 3

Preparation of Polyimide Film

A polyamic acid is acquired by combining 3,3'-dihydroxy benzidine (DHBZ) (20 mmol) and bicyclo[2.2.2]oct-7-ene-2,3,5,6-tetracarboxylic dianhydride (BTDA) (20 mmol) in the presence of N,N-dimethylacetamide (DMAc) solvent in a 500 mL round-bottomed flask, wherein the total weight of 3,3'-dihydroxy benzidine (DHBZ) and bicyclo[2.2.2]oct-7-ene-2,3,5,6-tetracarboxylic dianhydride (BTDA) is about 10 weight percent based on the total weight of the mixed solution, purging the contents of the round-bottom flask with $N_2$, and allowing the reaction to proceed for about 3 hours at a temperature of from about 0 to 5 degrees Celsius (° C.), and for about 12 hours at a room temperature (about 25° C.).

A cross-linked polyamic acid is prepared by heating the acquired polyamic acid to about 60° C., adding 1,4-phenylene diisocyanate (PDI) (1.0 mmol, which is 5 moles based on 100 moles of DHBZ) as a cross-linking agent and triethylamine (1.0 mmol) as a catalyst while purging with $N_2$, and allowing the reaction to proceed for about 12 hours at about 60° C.

A polyimide film is prepared by coating an octyltrichlorosilane-treated glass substrate with the cross-linked polyamic acid, allowing the coated substrate to stand for about 1 hour while purging the reaction vessel with $N_2$ at about 50° C., allowing the substrate to stand for about 1 hour under a vacuum at about 80° C., increasing the temperature to about 250° C. at a heating rate of about 1° C./min under the $N_2$ atmosphere, and heat-treating under the $N_2$ atmosphere for about 1 hour at about 250° C.

Example 4

Preparation of Polyimide Film

A polyimide film is prepared according to the method of Example 3, except that 1,4-cyclohexane diisocyanate (COI) (1.0 mmol) is used as a cross-linking agent instead of 1,4-phenylene diisocyanate (PDI) (1.0 mmol in Example 3).

Comparative Example 1

Preparation of Polyimide Film

A polyimide film is prepared according to the method of Example 1, except that the cross-linking process using a diisocyanate and a catalyst is not performed.

Comparative Example 2

Preparation of Polyimide Film

A polyamic acid is acquired by combining 3,3'-dihydroxy benzidine (DHBZ) (20 mmol) and 3,3',4,4'-biphenyl tetracarboxylic dianhydride (BPDA) (20 mmol) in the presence of N,N-dimethylacetamide (DMAc) solvent in a 500 mL round-bottomed flask, wherein the total weight of 3,3'-dihydroxy benzidine (DHBZ) and 3,3',4,4'-biphenyl tetracarboxylic dianhydride (BPDA) is about 10 weight percent based on the total weight of the mixed solution, purging the contents of the round-bottom flask with $N_2$, and allowing the reaction to proceed for about 3 hours at a temperature of from about 0 to 5 degrees Celsius (° C.), and for about 12 hours at a room temperature (about 25° C.).

A cross-linked polyamic acid is prepared by heating the acquired polyamic acid at about 60° C., adding 1,4-phenylene diisocyanate (PDI) (2.0 mmol, which is 10 moles based on 100 moles of DHBZ) as a cross-linking agent and triethylamine (2.0 mmol) as a catalyst while purging with $N_2$, and allowing the reaction to proceed for about 12 hours at about 60° C.

A polyimide film is prepared by coating an octyltrichlorosilane-treated glass substrate with the cross-linked polyamic acid, allowing the coated substrate to stand for about 1 hour while purging the reaction vessel with $N_2$ at about 50° C., subsequently allowing the substrate to stand for about 1 hour under a vacuum at about 80° C., increasing the temperature to about 250° C. at a heating rate of about 1° C./min under the $N_2$ atmosphere, and heat-treating under the $N_2$ atmosphere for about 1 hour at about 250° C. However, the polyimide film easily breaks into pieces, and upon application of the polyimide film to a surface, a continuous film does not form.

Comparative Example 3

Preparation of Polyimide Film

A polyimide film is prepared according to the method of Comparative Example 2, except that 1,4-cyclohexane diisocyanate (CDI) (2.0 mmol) is used as a cross-linking agent instead of 1,4-phenylene diisocyanate (PDI) (2.0 mmol in Comparative Example 2). However, the polyimide film easily breaks into pieces, and upon application of the polyimide film to a surface, a continuous film does not form.

Comparative Example 4

Preparation of Polyimide Film

A polyimide film is prepared according to the method of Example 3, except that the cross-linking process using a diisocyanate and a catalyst is not performed.

Comparative Example 5

Preparation of Polyimide Film

A polyamic acid is acquired by combining 3,3'-dihydroxy benzidine (DHBZ) (20 mmol) and bicyclo[2.2.2]oct-7-ene-2,3,5,6-tetracarboxylic dianhydride (BTDA) (20 mmol) in the presence of N,N-dimethylacetamide (DMAc) solvent in a 500 mL round-bottomed flask, wherein the total weight of 3,3'-dihydroxy benzidine (DHBZ) and bicyclo[2.2.2]oct-7-ene-2,3,5,6-tetracarboxylic dianhydride (BTDA) is about 10 weight percent based on the total weight of the mixed solution, purging the contents of the round-bottom flask with $N_2$, and allowing the reaction to proceed for about 3 hours at a temperature of from about 0 to 5 degrees Celsius (° C.), and for about 12 hours at a room temperature (about 25° C.

A cross-linked polyamic acid is prepared by heating the acquired polyamic acid at about 60° C., adding 1,4-phenylene diisocyanate (PDI) (2.0 mmol, which is 10 moles based on 100 moles of DHBZ) as a cross-linking agent and triethylamine (2.0 mmol) as a catalyst while purging with $N_2$, and allowing the reaction to proceed for about 12 hours at about 60° C.

A polyimide film is prepared by coating an octyltrichlorosilane-treated glass substrate with the cross-linked polyamic acid, allowing the coated substrate to stand for about 1 hour while purging the reaction vessel with $N_2$ at about 50° C., subsequently allowing the substrate to stand for about 1 hour under a vacuum at about 80° C., increasing the temperature to about 250° C. at a heating rate of about 1° C./min under the $N_2$ atmosphere, and heat-treating under the $N_2$ atmosphere for about 1 hour at about 250° C. However, the polyimide film easily breaks into pieces, and upon application of the polyimide film to a surface, a continuous film does not form.

Comparative Example 6

Preparation of Polyimide Film

A polyimide film is prepared according to the method of Comparative Example 5, except that 1,4-cyclohexane diisocyanate (CDI) (2.0 mmol) is used as a cross-linking agent instead of 1,4-phenylene diisocyanate (PDI) (2.0 mmol in Example 5). However, the polyimide film easily breaks into pieces, and upon application of the polyimide film to a surface, a continuous film does not form.

Experimental Example 1

Measurement of Coefficient of Thermal Expansion

A coefficients of thermal expansion (CTE) of each polyimide film prepared according to Examples 1 to 4 and Comparative Examples 1 to 6 are measured by a thermo mechanical analyzer ("TMA," model TMA 2940 available from TA Instruments) with a temperature ramp of 5° C./min and a pre-load set at 10 milliNewtons (mN). The results are presented in FIGS. 1 and 2 and the following Table 1.

In the case of Comparative Examples 2, 3, 5, and 6, the content of the cross-linking agent is so high that cross-linking is excessive. The amount of cross-linking hinders complete formation of the film. Therefore, the coefficients of thermal expansion for the samples produced in Comparative Examples 2, 3, 5, and 6 are not measured.

FIG. 1 is a graph showing dimension change (micrometers, μm) versus temperature (degrees Celsius, ° C.) and respective coefficients of thermal expansion for Example 1, Example 2, and Comparative Example 1.

Figure 2:
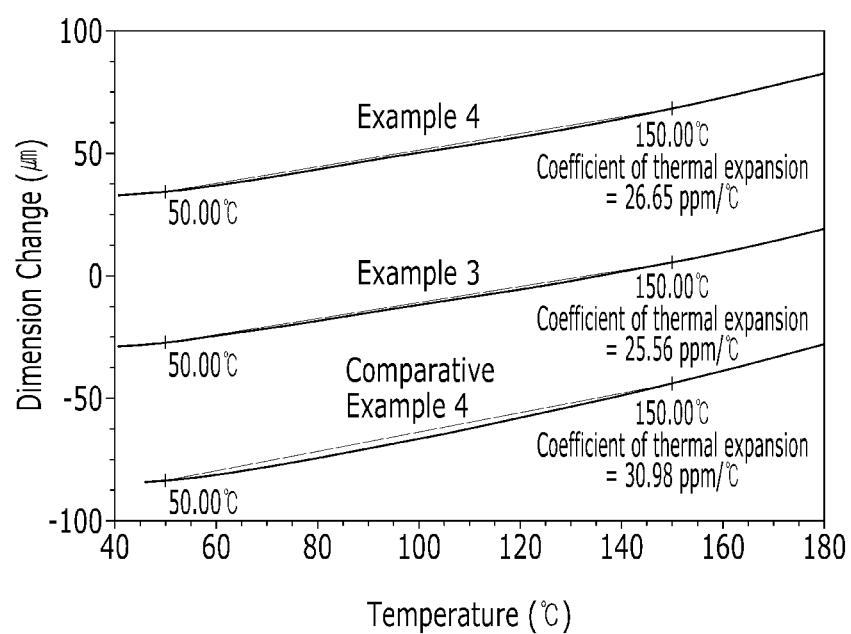
FIG. 2 is a graph showing dimension change (micrometers, μm) versus temperature (degrees Celsius, ° C.) and respective coefficients of thermal expansion for Example 3, Example 4, and Comparative Example 4.

FIG. 2 is a graph showing dimension change (micrometers, μm) versus temperature (degrees Celsius, ° C.) and respective coefficients of thermal expansion for Example 3, Example 4, and Comparative Example 4.

In FIGS. 1 and 2, the solid curves are experimental data acquired by the thermo mechanical analyzer, and the dashed lines are best-fit regression lines through the data from 50° C. to 150° C. The coefficients of thermal expansion shown in FIGS. 1 and 2 correspond to the slope of the respective best-fit regression lines.

Experimental Example 2

Measurement of Thermal Decomposition Temperature

Figure 3:
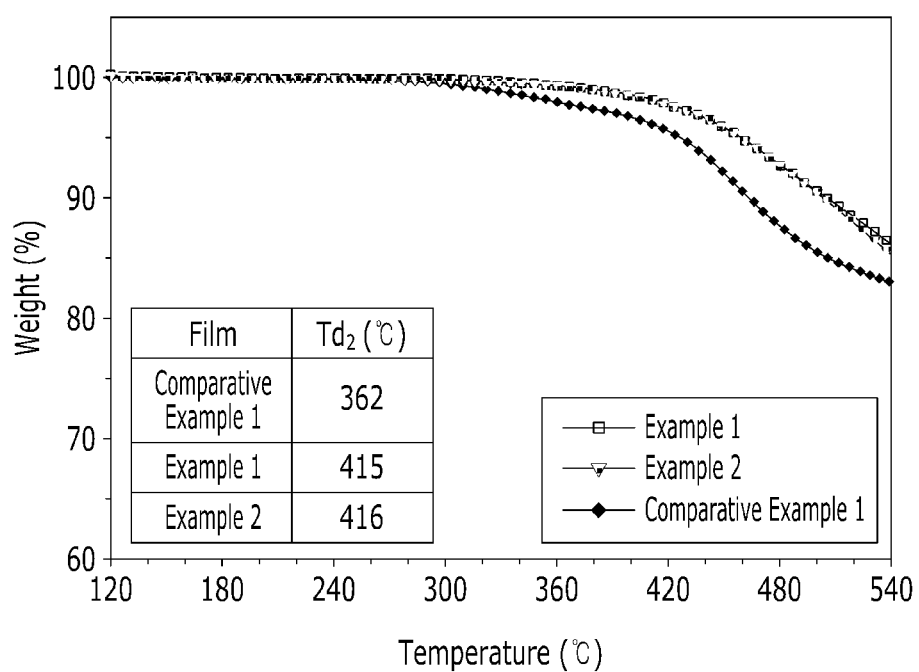
FIG. 3 is a graph showing relative weight (percent, %) versus temperature (degrees Celsius, ° C.) of data acquired by a thermogravimetric analyzer for Example 1, Example 2, and Comparative Example 1.
Figure 4:
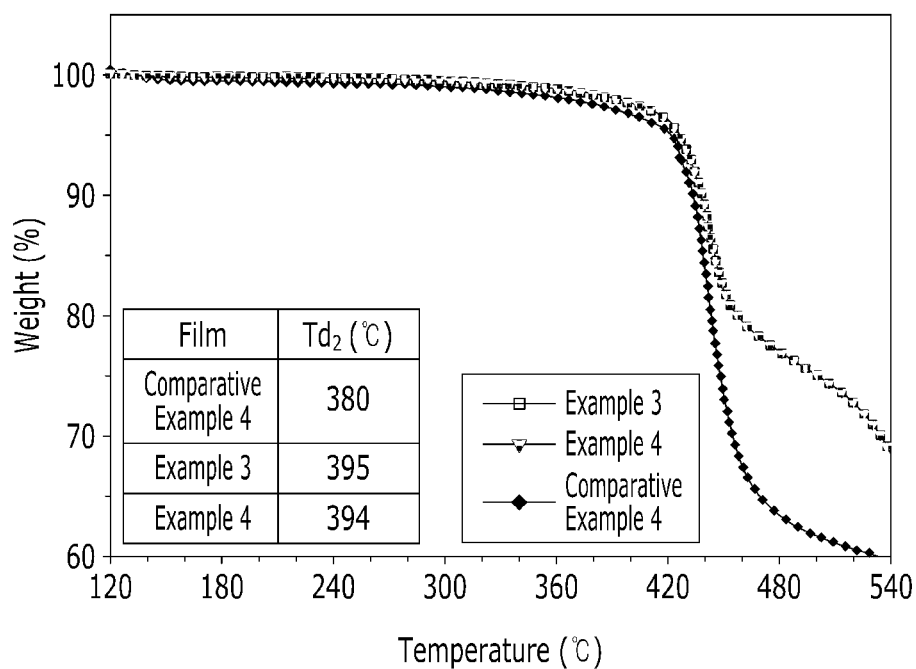
FIG. 4 is a graph showing relative weight (percent, %) versus temperature (degrees Celsius, ° C.) of data acquired by a thermogravimetric analyzer for Example 3, Example 4, and Comparative Example 4.

The glass transition temperature ($T_g$) of each polyimide film prepared according to Example 1 to 4 and Comparative Examples 1 to 6 is measured with differential scanning calorimetry ("DSC," model DSC 2010 available from TA Instruments Company), and the decomposition temperature $T_{d2}$ of each film is measured with a thermogravimetric analyzer ("TGA," model TGA Q5000 available from TA Instruments Company) at a heating rate of 10° C./min. The results are shown in the following Table 1. Also, graphs of data acquired from the thermogravimetric analyzer are shown in FIGS. 3 and 4. The decomposition temperature $T_{d2}$ signifies the temperature for which the sample loses 2 weight percent (wt. %) by decomposition, based on the initial weight of the respective sample of Example 1 to 4 and Comparative Examples 1 to 6. In the case of Comparative Examples 2, 3, 5, and 6, the content of the cross-linking agent is so high that the cross-linking is excessive. This amount of cross-linking hinders complete formation of the films. Therefore, the thermal decomposition temperature $T_{d2}$ for the samples produced in Comparative Examples 2, 3, 5, and 6 are not measured.

FIG. 3 is a graph showing relative weight (percent, %) versus temperature (degrees Celsius, °C.) of data acquired by the thermogravimetric analyzer for Examples 1 and 2 and Comparative Example 1. "Relative weight" refers to the weight of a sample as compared to the initial weight of that sample. Therefore, a relative weight of 100% corresponds to no weight change in a sample, while a relative weight of 60% corresponds to a 40% loss of weight of the sample compared to its initial weight.

FIG. 4 is a graph showing relative weight (percent, %) versus temperature (degrees Celsius, °C.) of data acquired by the thermogravimetric analyzer for Examples 3 and 4 and Comparative Example 4.

Experimental Example 3

Optical Properties

Light transmittances for light of about 400 nm to about 750 nm of the polyimide films prepared according to Examples 1 to 4 and Comparative Examples 1 to 6 are measured with a spectrophotometer (model CM-3600D, available from Konica Minolta), and the results are presented in the following Table 1. In the case of Comparative Examples 2, 3, 5 and 6, the content of the cross-linking agent is so high that the cross-linking is excessive. This amount of cross-linking hinders complete formation of the films. Therefore, the light transmittance values for the samples produced in Comparative Examples 2, 3, 5, and 6 are not measured.

$T_{d2}$ compared with the polyimide film prepared according to Comparative Example 1 that does not use a cross-linking agent.

The films prepared according to Comparative Example 2 and 3 by using 10 moles of the cross-linking agent based on 100 moles of the hydroxyl group-containing diamine do not form a continuous film because an imidization reaction occurs, and the film fragments into pieces on the glass substrate.

In terms of light transmittance, the polyimide films prepared according to Examples 1 and 2 and Comparative Example 1 have little difference between them.

As shown in FIGS. 2 and 4 and Table 1, the polyimide films prepared according to Examples 3 and 4 by using 5 moles of the cross-linking agent based on 100 moles of the hydroxyl group-containing diamine have a small coefficient of thermal expansion and a high decomposition temperature $T_{d2}$ compared with the polyimide film prepared according to Comparative Example 4 without using a cross-linking agent.

The polyimide films prepared according to Comparative Examples 5 and 6 by using 10 moles of the cross-linking agent based on 100 moles of the hydroxyl group-containing diamine do not form a continuous film because an imidization reaction occurs, and the film fragments into pieces on the glass substrate.

In terms of the light transmittance, the polyimide films prepared according to Examples 3 and 4 and Comparative Example 4 have little difference between them.

Therefore, the polyimide films prepared by using the cross-linking agent in an amount of less than about 10 moles based on 100 moles of the hydroxyl group-containing diamine may form a continuous film and have a small coefficient of thermal expansion to effectively improve the thermal stability while maintaining the optical transmittance of the prepared polyimide film.

While this disclosure has been described in connection with what is presently considered to be practical exemplary

TABLE 1

| | Diamine (mmol) | Acid dianhydride (mmol) | Cross-linking agent (mmol) | Coefficient of thermal expansion (ppm/°C.) | $T_{d2}$ (°C.) | $T_g$ (°C.) | Light transmittance (%) |
|---|---|---|---|---|---|---|---|
| Comp. Ex. 1 | DHBZ 20 | BPDA 20 | — | 15.06 | 362 | 319 | 63.8 |
| Ex. 1 | DHBZ 20 | BPDA 20 | PDI 1 | 10.66 | 415 | ND | 64.3 |
| Ex. 2 | DHBZ 20 | BPDA 20 | CDI 1 | 12.27 | 416 | ND | 67.4 |
| Comp. Ex. 4 | DHBZ 20 | BTDA 20 | — | 30.98 | 380 | ND | 72.1 |
| Ex. 3 | DHBZ 20 | BTDA 20 | PDI 1 | 25.56 | 395 | ND | 72.2 |
| Ex. 4 | DHBZ 20 | BTDA 20 | CDI 1 | 26.65 | 394 | ND | 71.4 |

In Table 1, ND denotes that the glass transition temperature ($T_g$) of the corresponding film has a glass transition temperature ($T_g$) that is beyond the temperature limit of the DSC equipment, which is about 340°C.

As shown in FIGS. 1 and 3 and Table 1, the polyimide films prepared according to Examples 1 and 2 by using about 5 moles of the cross-linking agent based on 100 moles of the hydroxyl group-containing diamine have a small coefficient of thermal expansion and a high decomposition temperature embodiments, it is to be understood that the invention is not limited to the disclosed embodiments, but, on the contrary, is intended to cover various modifications and equivalent arrangements included within the spirit and scope of the appended claims.

What is claimed is:
1. A polyimide precursor composition comprising:
   a polyamic acid comprising a repeating unit represented by the following Chemical Formula 1; and
   a diisocyanate represented by the following Chemical Formula 2, wherein the diisocyanate represented by the following Chemical Formula 2 is included in an amount of about 0.01 moles to about 10 moles based on 100 moles of the repeating unit represented by the following Chemical Formula 1 in the polyamic acid:

Chemical Formula 1

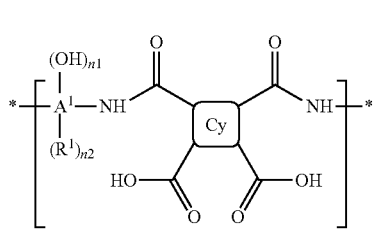

wherein, in Chemical Formula 1,

Cy is the same or different in each repeating unit, and each Cy is independently a tetravalent functional group comprising a substituted or unsubstituted C4 to C20 carbocyclic group, a substituted or unsubstituted C6 to C20 monocyclic aromatic group, a substituted or unsubstituted C2 to C20 condensed polycyclic aromatic group, C2 to C20 non-condensed polycyclic aromatic groups linked to each other through a substituted or unsubstituted aromatic group, or a combination comprising at least one of the foregoing, $A^1$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, a substituted or unsubstituted C2 to C40 siloxane, or a combination comprising at least one of the foregoing, $R^1$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination comprising at least one of the foregoing, n1 is an integer of from 1 or greater,
n2 is an integer of from 0 to 10, and
n1+n2 is determined by a valence of $A^1$, OCN-$A^2$-NCO          Chemical Formula 2 wherein, in Chemical Formula 2, $A^2$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C4 to C40 heteroaralkylene group, a substituted or unsubstituted C5 to C40 cycloalkylene group, a substituted or unsubstituted C5 to C40 heterocycloalkylene group, or a combination comprising at least one of the foregoing.

2. The polyimide precursor composition of claim 1, wherein the diisocyanate represented by Chemical Formula 2 is included in an amount of about 2 moles to about 7 moles based on 100 moles of the repeating unit represented by Chemical Formula 1 in the polyamic acid.

3. The polyimide precursor composition of claim 1, wherein the repeating unit represented by Chemical Formula 1 comprises a repeating unit represented by the following Chemical Formula 3:

Chemical Formula 3

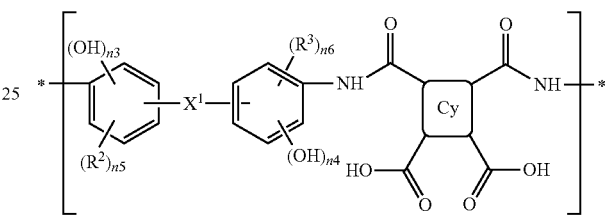

wherein, in Chemical Formula 3,

Cy is the same as in Chemical Formula 1, $X^1$ is a single bond, $(CR^{200}R^{201})_{k1}$, $SO_2$, O, C(=O), or a combination comprising at least one of the foregoing, wherein $R^{200}$ and $R^{201}$ are the same or different and are independently hydrogen, a hydroxyl group, a C1 to C10 alkyl group, or a C1 to C10 fluoroalkyl group, and k1 is an integer of from 1 to 5, $R^2$ and $R^3$ are each hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination comprising at least one of the foregoing, n3 to n6 are independently integers of from 0 to 4, n3+n5 is an integer of from 0 to 4, n4+n6 is an integer of from 0 to 4, and n3+n4 is an integer of from 1 to 8.

4. The polyimide precursor composition of claim 1, wherein the repeating unit represented by Chemical Formula 1 comprises a repeating unit represented by the following Chemical Formulae 4 to 14, or a combination comprising at least one of the foregoing:

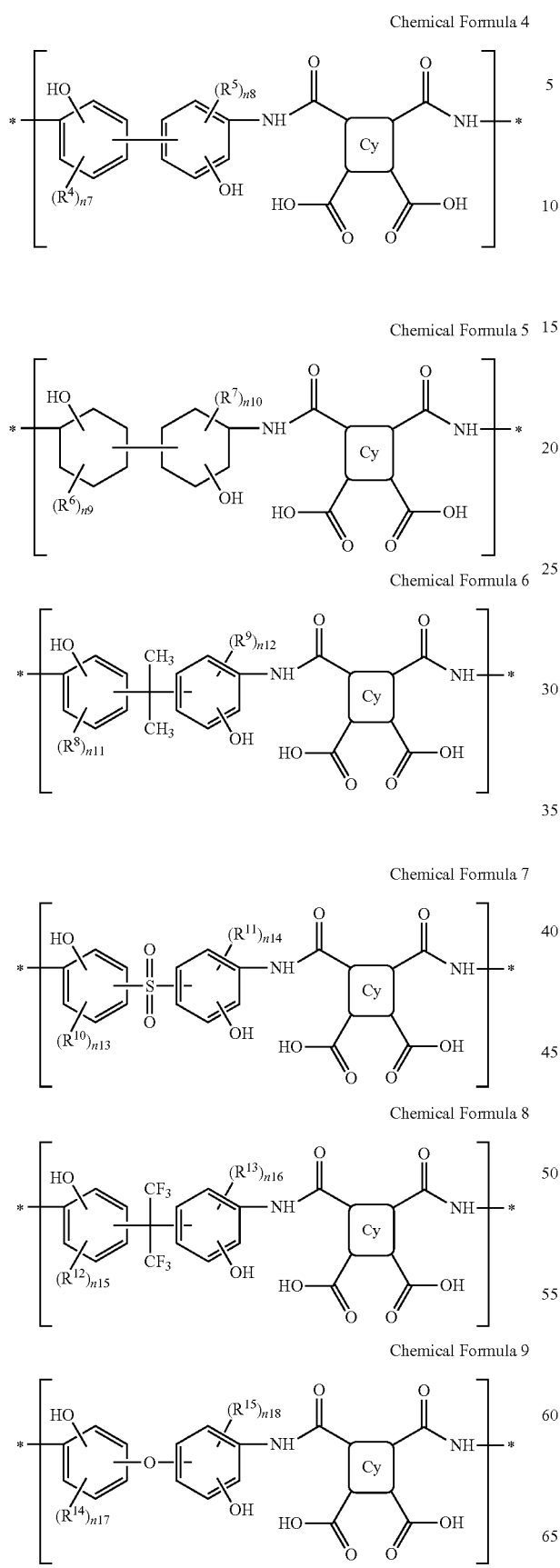
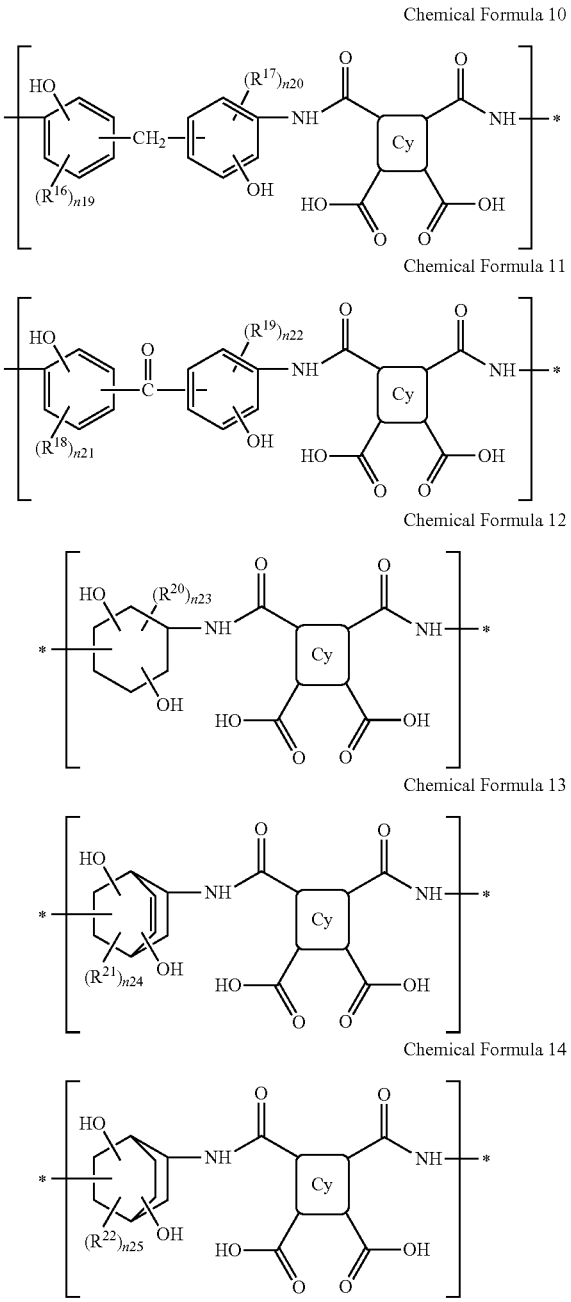

wherein, in Chemical Formulae 4 to 14,
Cy is the same as in Chemical Formula 1,
$R^4$ to $R^{22}$ are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination comprising at least one of the foregoing, n7 and n8 are each independently integers of from 0 to 3, n9 and n10 are each independently integers of from 0 to 9, n11 to n22 are each independently integers of from 0 to 3, n23 and n24 are each independently integers of from 0 to 8, and n25 is an integer of from 0 to 10.

5. The polyimide precursor composition of claim 1, wherein the diisocyanate represented by Chemical Formula 2 comprises a diisocyanate represented by the following Chemical Formulae 15 to 19, or a combination of at least one of the foregoing:

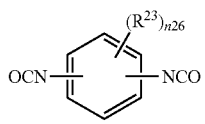

Chemical Formula 15

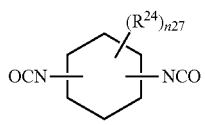

Chemical Formula 16

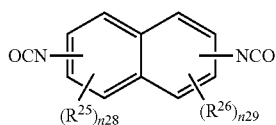

Chemical Formula 17

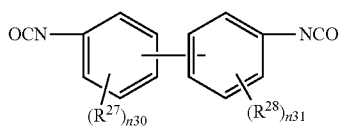

Chemical Formula 18

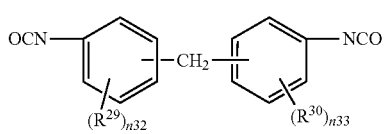

Chemical Formula 19 wherein, in Chemical Formulae 15 to 19, $R^{23}$ to $R^{30}$ are each independently hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination comprising at least one of the foregoing, and n26, n30, n31, n32, and n33 are each independently integers of from 0 to 4, n27 is an integer of from 0 to 10, and n28 and n29 are each independently integers of from 0 to 3.

6. The polyimide precursor composition of claim 1, wherein the polyamic acid further comprises a repeating unit represented by the following Chemical Formula 20:

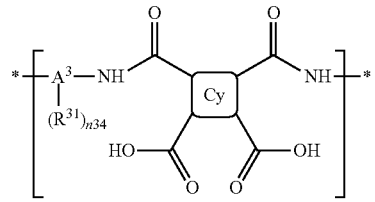

Chemical Formula 20 wherein, in Chemical Formula 20,

Cy is the same as in Chemical Formula 1, $A^3$ is a substituted or unsubstituted C1 to C20 alkylene group, a substituted or unsubstituted C5 to C40 arylene group, a substituted or unsubstituted C6 to C40 aralkylene group, a substituted or unsubstituted C3 to C40 heteroarylene group, a substituted or unsubstituted C6 to C40 heteroaralkylene group, a substituted or unsubstituted C5 to C40 cycloalkylene group, a substituted or unsubstituted C5 to C40 heterocycloalkylene group, a substituted or unsubstituted C2 to C40 siloxane, or a combination comprising at least one of the foregoing, $R^{31}$ is hydrogen, a substituted or unsubstituted C1 to C15 alkyl group, a substituted or unsubstituted C1 to C15 alkoxy group, a substituted or unsubstituted C1 to C15 fluoroalkyl group, a substituted or unsubstituted C3 to C15 cycloalkyl group, a substituted or unsubstituted C3 to C15 heterocycloalkyl group, a substituted or unsubstituted C3 to C15 cycloalkyloxy group, a substituted or unsubstituted C6 to C15 aryl group, a substituted or unsubstituted C7 to C15 aralkyl group, a substituted or unsubstituted C6 to C15 aryloxy group, a substituted or unsubstituted C7 to C15 aralkyloxy group, a substituted or unsubstituted C2 to C15 heteroaryl group, a substituted or unsubstituted C3 to C15 heteroaralkyl group, or a combination comprising at least one of the foregoing, n34 is an integer of from 0 to 10, and n34 is determined by a valence of $A^3$.

7. The polyimide precursor composition of claim 6, wherein the polyamic acid comprises the repeating unit represented by Chemical Formula 1 and the repeating unit represented by Chemical Formula 20 in a mole ratio of about 50:50 to about 99.9:0.1 (Chemical Formula 1:Chemical Formula 20).

* * * * *